(12) United States Patent
Engel et al.

(10) Patent No.: US 9,020,970 B2
(45) Date of Patent: Apr. 28, 2015

(54) EMBEDDABLE WEB APPLICATION AGENT

(75) Inventors: Maxwell R. Engel, Santa Monica, CA (US); Justin Cody Simms, Los Angeles, CA (US); Zhaowei Charlie Jiang, Palo Alto, CA (US); Wade Chambers, Fremont, CA (US); Xavier Legros, Woodside, CA (US)

(73) Assignee: Yahoo! Inc., Sunnyvale, CA (US)

( * ) Notice: Subject to any disclaimer, the term of this patent is extended or adjusted under 35 U.S.C. 154(b) by 472 days.

(21) Appl. No.: 12/200,630

(22) Filed: Aug. 28, 2008

(65) Prior Publication Data

US 2010/0057701 A1   Mar. 4, 2010

(51) Int. Cl.
*G06F 17/30* (2006.01)
*H04L 29/08* (2006.01)

(52) U.S. Cl.
CPC .......... *G06F 17/3089* (2013.01); *H04L 67/02* (2013.01)

(58) Field of Classification Search
CPC .................................. G06F 17/3089
USPC .................. 707/770; 709/203, 222; 715/738
See application file for complete search history.

(56) References Cited

U.S. PATENT DOCUMENTS

| 6,356,905 | B1 * | 3/2002 | Gershman et al. ............... 1/1 |
| 2008/0133722 | A1 * | 6/2008 | Ramasundaram et al. ... 709/222 |
| 2009/0055749 | A1 * | 2/2009 | Chatterjee et al. ............ 715/738 |

OTHER PUBLICATIONS

Google Code, Google Gears API, http://code.google.com/apis/gears/, Dec. 3, 2007, 24 pgs.
Adobe Developer Connection, Central 1.5: Desktop Dynamo, http://www.adobe.com/devnet/central/articles/whatsnew_15.html, 8 pgs.

* cited by examiner

*Primary Examiner* — Huawen Peng
(74) *Attorney, Agent, or Firm* — Berkeley Law & Technology Group, LLP (57) ABSTRACT

In one example embodiment, a code segment may be embedded in a web page by a web page publisher, and the code segment may be executed at least in part by a user computing platform. Information related to one or more web applications may be provided to the user computing platform at least in part in response to the user computing platform executing the code segment.

50 Claims, 8 Drawing Sheets

EMBEDDABLE WEB APPLICATION AGENT

This patent application is being concurrently filed with U.S. patent application Ser. No. 12/200,545, titled "Multiple Views for Web Applications Across Multiple Endpoints," filed on Aug. 28, 2008, by Gibb et al.; and U.S. patent application Ser. No. 12/200,783, titled "Contextually Aware Web Application," filed on Aug. 28, 2008, by Engel et al.; both of which are assigned to the assignee of currently claimed subject matter and incorporated by reference in their entirety.

FIELD

Subject matter disclosed herein may relate to a web application execution platform, and more particularly to a code segment embedded in a web page and executed on a user computing platform.

BACKGROUND

With networks such as the Internet gaining tremendous popularity, and with the vast multitude of pages and/or other documents and/or other media content becoming available to users via the World Wide Web (web), it has become desirable for some web page publishers to implement application execution environments to allow users to run applications via the publisher's web site, and to entice users to visit the sites. Such application execution environments may comprise "stand alone" environments, with the web page publisher performing page assembly as well as performing back-end integration with data storage, social information, etc.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, it may be desirable for web page publishers to implement application execution environments to allow users to run applications via the publisher's web site, and to entice users to visit particular web sites. Such application execution environments may comprise "stand alone" environments, with the web page publisher performing page assembly as well as performing back-end integration with data storage, social information, etc.

However, web sites wishing to implement an application execution environment may typically develop their own application platform, or may purchase and/or license an existing platform. Additionally, as alluded to above, the web site publisher may perform all of the data storage and/or social information storage/handling, as well as application execution. Also, the web page publisher may desire to create a gallery whereby a user may discover and/or browse applications. Thus, considerable resources may be committed to the creation and/or operation of application execution environments, making it relatively costly and/or difficult for web page publishers to implement such environments. Further, the "stand alone" nature of the application execution environments may make it difficult for the environment developer to share applications and/or application execution environments. Additionally, due to the proprietary nature of application execution environments, applications that are developed to operate in a particular execution environment may not be compatible with other execution environments, thus negatively impacting the portability of such applications.

In an example embodiment, an application execution environment may be divided among an application platform, a web page publisher, and a user computing platform. For this example embodiment, a code segment may be provided to a web page publisher by an application platform. The code segment may be embedded in a web page generated by the web page publisher, and the user computing platform may execute the code segment at least in part in response to loading the web page. Further, for this example embodiment, a request for information related to one or more web applications may be received by the application platform from the user computing platform. The user computing platform may make the request at least in part in response to executing the code segment. The application platform may provide information related to the one or more web applications to the user computing platform.

In this example embodiment, the application platform may provide so-called "back-end" services such as data storage, application development, and/or page assembly, as well as provide-social back-end database information, for just a few examples of services that may be provided. Thus, the web site publisher may be relieved of the burden of directly providing these services, and the cost and/or overhead of developing and/or maintaining the application execution environment may be reduced. Additional embodiments are discussed more fully below.

Figure 1:
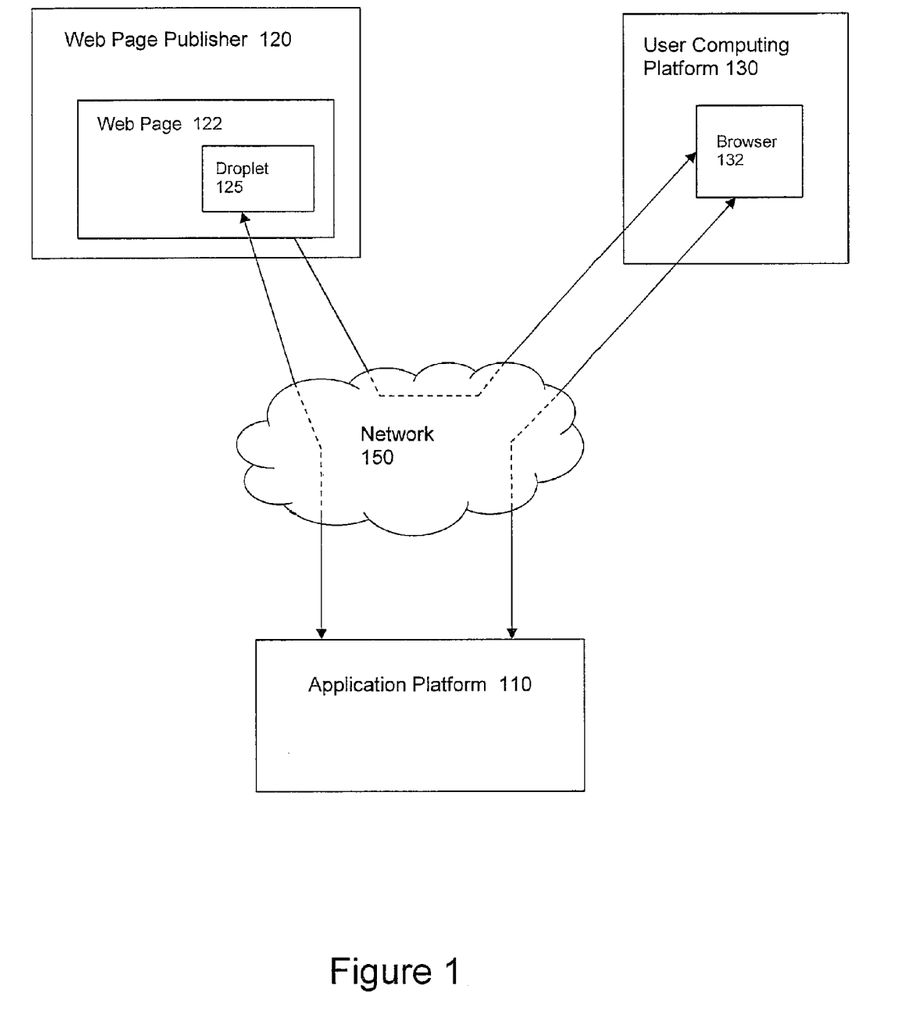
FIG. 1 is a diagram illustrating an example system including an application platform and a web page publisher in accordance with one or more embodiments.

FIG. 1 is a diagram illustrating an example system including an application platform 110 and a web page publisher 120. The system for this example also comprises a user computing platform 130. Application platform 110, web page publisher 120, and user computing platform 130 for this example may be coupled to each other by way of a network 150. For this example embodiment, network 150 may comprise the Internet, although the scope of claimed subject matter is not limited in this respect.

The Internet comprises a worldwide system of computer networks and is a public, self-sustaining facility that is accessible to tens of millions of people worldwide. The most widely used part of the Internet is the World Wide Web, often abbreviated "WVWW" or simply referred to as just "the web". The web is an Internet service that organizes information through the use of hypermedia. The HyperText Markup Language ("HTML") is typically used to specify the contents and format of a hypermedia document (e.g., a web page). The Extensible Markup Language (XML) may also be used to specify the contents and format of a web page. As used herein, a web site may refer to a collection of related web pages. The term "web page" as used herein may relate to any electronic document that may be accessed via a network such as the Internet. As alluded to above, in one or more embodiments, web pages for an example embodiment may comprise documents coded using one or more markup languages, such as, for example, HTML and/or XML, although the scope of claimed subject matter is not limited in this respect.

User computing platform 130 for this example embodiment may comprise a processor (not shown) that may execute instructions, including executing instructions related to a web browser 132. Web browser 132 for this example may comprise a conventional web browser to be executed by user computing platform 130 to allow a user to access and view web pages from across the Internet, including pages published by web page publisher 120. To view a page published by web page publisher 120, browser 132 may cause the page to be downloaded from web page publisher 120 to user computing platform 130, where the page may be displayed to the user. A web page may be identified by a Uniform Resource Identifier (URI) such as, for example, a Uniform Resource Locator (URL) associated with the web page.

For this example embodiment, web page publisher 120 may desire to implement an application execution environment on a web page. For example, web page publisher 120 may desire to provide a game application for use by one or more users across the Internet in the hopes that the game application may entice users to visit a web site. Application platform 110 may have stored thereon instructions implementing the desired application, and may further comprise a code segment associated with the desired application. Application platform 110 may transmit the code segment to web page publisher 120. For this example, the code segment may comprise instructions related to the application, which, for this example, may comprise the game application, although the scope of claimed subject matter is not limited in this respect. For an embodiment, the code segment may comprise Javascript instructions to implement the application. Javascript is a scripting language that may be embedded in an electronic document, such as, for example, an HTML based document. Although the example embodiments described herein utilize Javascript to implement applications, Javascript is merely an example of type of code that may be used to implement an application, and the scope of claimed subject matter is not limited in this respect. For example, for one or more additional embodiments, the code segment may comprise code implemented in PHP such as, for example, PHP release 5.2.6, although the scope of claimed subject matter is not limited in this respect. PHP is another example of a scripting language that may be embedded into an electronic document, such as an HTML document, for example, although the scope of claimed subject matter is not limited in this respect.

For one or more embodiments, the code segment may be embedded in one or more web pages by web page publisher 120. One such web page is labeled page 122 in FIG. 1. Web page 122 may include an area on the page on which one or more applications may be run. The application area may be referred to as a "DropZone" in one or more embodiments, although the scope of claimed subject matter is not limited in this respect. Further, the code segment may be referred to as a "Droplet", such as, for example, Droplet 125 of FIG. 1, and may comprise instructions related to the one or more applications as well as instructions that may be utilized to implement the application execution area (dropzone) on web page 122. As used herein, the term "code segment" is meant to include one or more instructions used to implement an application execution area in an electronic document, such as, for example a web page. Also, as used herein, the terms "code segment" and "Droplet" are interchangeable.

User computing platform 130 may, via browser 132, request the aforementioned web page 122 with the embedded droplet 125 from web page publisher 120. At least in part in response to receiving web page 122, browser 132 may execute the embedded code segment. The code segment may include instructions that may direct user computing platform 130 to communicate with application platform 110, for an example embodiment. For example, the execution of droplet 125 may direct user computing platform 130 to request information related to the application from application platform 110. Application platform 110 may, at least in part in response to receiving the request, provide the information to user computing platform 130, which may in turn utilize the information in the execution of the droplet. The information related to the application may comprise any of a wide range of information types, including, but not limited to, social backend information, user profile information, assembled pages, executable code, application configuration information, information related to the "look and feel" of the application, etc.

As described above, a droplet may be associated with one or more applications. For one embodiment, the droplet may direct user computing platform 130 to communicate with application platform 110 in order to implement the one or more applications. Thus, web page publisher 120 may provide the one or more applications to user computing platform 130, but does not incur the overhead of providing application services, such as data storage/transfer and application execution, as these services are provided by application platform 110. For one or more embodiments, droplet 125 may comprise relatively few instructions, perhaps merely one or a few lines of code in some examples, and the bulk of the application processing responsibilities may be performed by application platform 110. In this manner, web page publisher 120 may distribute an application such as the application associated with droplet 125 with relative ease, due to the relatively small size of the droplet. Further, the small size of the droplet may allow an application developer to widely disseminate the application to a wide range of web page publishers, if desired. Web page publishers may be enticed to include the application in their web pages because of the relatively low overhead associated with embedding the code segment, and because the "heavy lifting" of the application execution and/or data transfer/storage associated with the application is handled by application platform 110.

For one or more embodiments, the one or more applications associated with droplet 125 may be largely executed by application platform 110, with relatively little processing performed by user computing platform 130. For one example embodiment, application platform 110 may receive keystroke and/or pointing device information from user computing platform 130, and in response may assemble appropriate pages of javascript code to be executed by browser 132. Compute-intensive operations may be performed by application platform 110, thereby relieving user computing platform 130 of much of the burden of executing the one or more applications, for an example embodiment. Browser 132 for this example may receive the assembled pages of javascript code and may run the code using a javascript interpreter coupled with browser 132. The application may be displayed by browser 132 in the web page's dropzone. Thus, the overhead incurred by user computing platform 130 in executing the one or more applications is relatively small. Further, because web page publisher 120 is not involved in the transfer of the assembled javascript pages, web page publisher 120 does not incur a load other than initially delivering web page 122 including droplet 125 to user computing platform 130.

For one or more other embodiments, user computing platform 130 may be more involved in the execution of the application than was the case in the previous example embodiments. The droplet and its associated one or more applications may be architected in a manner to allocate execution responsibilities in any way that may be advantageous.

Figure 2:
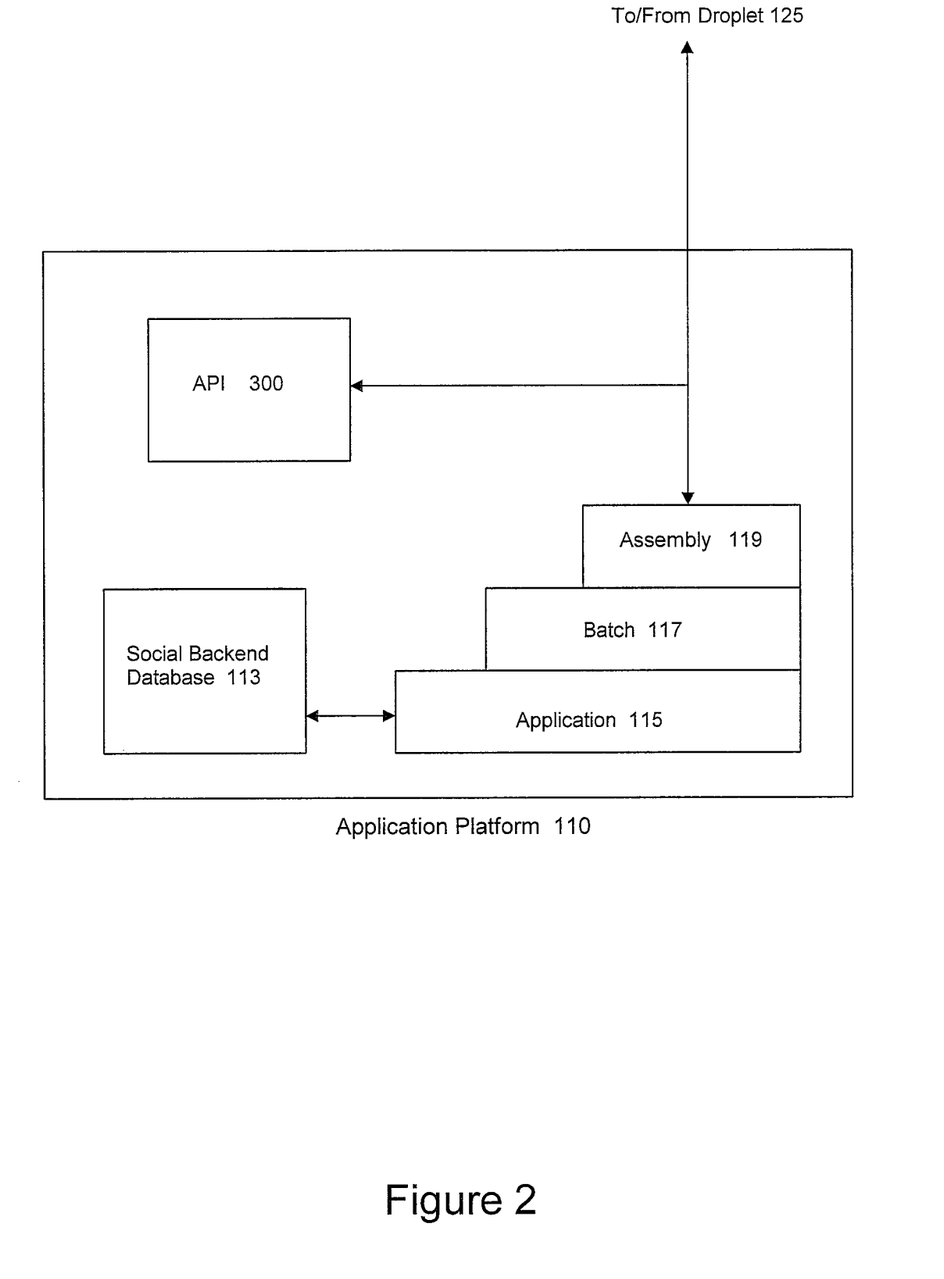
FIG. 2 is a block diagram illustrating an example application platform in accordance with one or more embodiments.

FIG. 2 is a block diagram illustrating example application platform 110 in more detail. Application platform 110 may comprise a computing platform including one or more processors (not shown). Application platform 110 may comprise a social backend database 113 that may store social information that may be used in connection with one or more applications. Social information may comprise any of a wide range of information types. Some examples of social information may include, but are not limited to, user profile information, friends lists for a number of users, game scores and/or progress information, lists of visited web sites, information regarding user browsing behaviors, information regarding user's interests, etc. Of course, these are merely examples of social information, and the scope of claimed subject matter is not limited in this regard.

Figure 3:
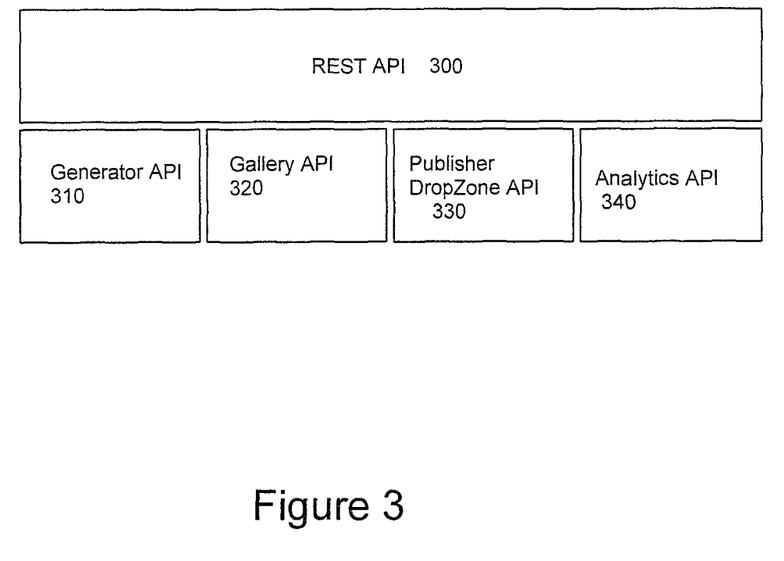
FIG. 3 is a diagram illustrating an example application programming interface in accordance with one or more embodiments.

Application platform 110 may execute instructions that may implement an application programming interface (API) 300, as well as a software stack comprising an application layer 115, a batch layer 117, and an assembly layer 119. Application layer 115 may comprise instructions that, if executed, direct application platform 110 to generate one or more applications. Any of a wide range of application types may be implemented, and any number of applications may be implemented. Examples of application types that may be implemented may include, but are not limited to, fantasy sports games, word processors, spreadsheet calculators, card games, board games, financial applications, musical composition and notation, educational applications, language study applications, etc., to name but a few. Of course, these are merely examples of application types, and the scope of claimed subject matter is not limited in these respects. Also, for one or more embodiments, the one or more applications to be implemented may be specified by a web page publisher and/or by a user, discussed more fully below.

For one or more embodiments, a gallery application may be provided through the dropzone. The gallery application may allow a user to select one or more additional applications to be displayed in the dropzone. Also, web page publisher 120 may specify ranges of applications to be included in the gallery application, as discussed more fully below. In this manner, a web page publisher may specify one or more applications to be made available to users, and users may select one or more of those applications to be displayed in the dropzone.

Batch layer 117 may comprise instructions that, if executed, may batch together the one or more applications provided by application layer 115. Assembly layer 119 may comprise instructions that, if executed, direct application platform 110 to assemble one or more pages of code according to the batched one or more applications for delivery to user computing platform 130. For this example, the pages of code may comprise javascript code, although the scope of claimed subject matter is not limited in this respect.

Further for this example embodiment, web page publisher 120 may communicate with application platform 110 by way of API 300, described in more detail below. Communications may take place through droplet 125, for this example embodiment. That is, droplet 125 may include code that if executed may communicate provide programming hooks for web page publisher 120 in order for web page publisher 120 to make a variety of requests of application platform 110.

FIG. 3 is a diagram illustrating an example embodiment of API 300. For one or more embodiments, the APIs described herein may comprise "restful" APIs. A "restful" API may refer to any relatively simple interface which may transmit domain-specific data over hypertext transfer protocol (HTTP) without an additional messaging layer, for one example embodiment. Restful APIs may be characterized, at least in part, by their simplicity. Of course, a restful API is merely an example, and the scope of claimed subject matter is not limited in this respect. For this example embodiment, API 300 may comprise several sub-APIs. For example, API 300 may comprise a generator API 310, a gallery API 320, a publisher dropzone API 330, and an analytics API 340. In an embodiment, generator API 310 may comprise an API through which web page publisher 120 may request one or more applications to be included in its dropzone. Note again that any number of applications may be included in a dropzone for one or more embodiments. Gallery API 320 for an embodiment may comprise a read-only API through which web publisher 120 may receive information regarding which applications may be included in the dropzone for a particular web site. In other embodiments, Gallery API 320 may not be implemented as read-only, and may permit communication from the web page publisher, discussed more fully below. Also, publisher dropzone API 330 for this example may comprise an API through which web publisher 120 may specify various aspects of its dropzone including, but not limited to, specific applications to be included in the dropzone as well as customization parameters. The customization parameters for this example may comprise parameters that specify the "look and feel" of a web page's dropzone. The look and feel aspects of a dropzone may include a presentation layer that may comprise a skin as well as a menu system, which, for an embodiment may be referred to as a "chrome" architecture.

For one or more embodiments, Gallery API 320 may provide the web page publisher with an interface to be able to specify to application platform 110 ranges of applications to be made available to end users. Application platform 110 may provide a gallery of applications within a dropzone that may be browsed by a user, and the user may be allowed to select from the gallery one or more applications to be displayed in the dropzone. For one or more embodiments, web page publisher 120 may specify lists of applications approved for inclusion in the gallery provided to the user, and/or may specify lists of applications that are not approved for inclusion. In other words, web page publisher may white-list one or more applications for inclusion in the gallery provided to the user, and/or may black-list one or more applications that are not to be included in the gallery provided to the user. Web page publisher 120 may specify the ranges of applications to include and/or to exclude from the gallery provided to the user in one or more embodiments by specifying ranges of applications based on one or more characteristics of the applications. For example, web page publisher may specify that applications developed by a specific entity be included in the gallery, or may specify that all available applications related to a particular subject matter by excluded from the gallery. Other characteristics that web page publisher 120 may use to specify ranges of applications to be included in the gallery presented to the user may include, but are not limited to, application name, application developer, language, user location, category, application rankings, and/or any other metadata type that may be associated with an application. Of course, the above is merely one example of a technique for allowing a web page publisher to specify applications to be made available to users, and the scope of claimed subject matter is not limited in these respects.

API 300 may also comprise an analytics API 340 through which web publisher 120 may request various statistics regarding a dropzone. For example, web publisher 120 may request information related to the performance of one or more applications, as well as information regarding which is the more popular application among a number of applications, to name just a couple of examples. Of course, other types of information may be made available through the analytics API in one or more embodiments. It should be noted that for one or more embodiments, web publisher 120 may access API 300 through droplet 125, and that for one or more embodiments there may be no other paths through which web publisher 120 may access API 300.

In a further aspect, for one or more example embodiments, a dropzone may generate discoverable URLs for one or more views of an application, wherein the URLs may include the domain of the web site in which the dropzone is embedded. In this manner, a view of a particular application accessed through one web page publisher and a view of that particular application accessed through a different web page publisher would have unique URLs. For one or more embodiments, as a user navigates from page to page within an application displayed in the dropzone, unique URLs may be generated for those pages. In embodiments that do not generate URLs for pages of an application, all pages of the application may be identified by a single URL, and there would be no way to uniquely identify individual pages of an application. Unique URLs for the various pages of an application may make it easier to allow a user to navigate around an application by using a browser's "back" and/or "forward" buttons, and may allow for the bookmarking of individual pages. Also, in one or more embodiments, the generation of discoverable URLs may also be used advantageously in advertising and/or other monetization operations. Of course, these are merely examples of how URLs may be associated with an application and of how such URLs may be utilized, and the scope of claimed subject matter is not limited in these respects.

Figure 4:
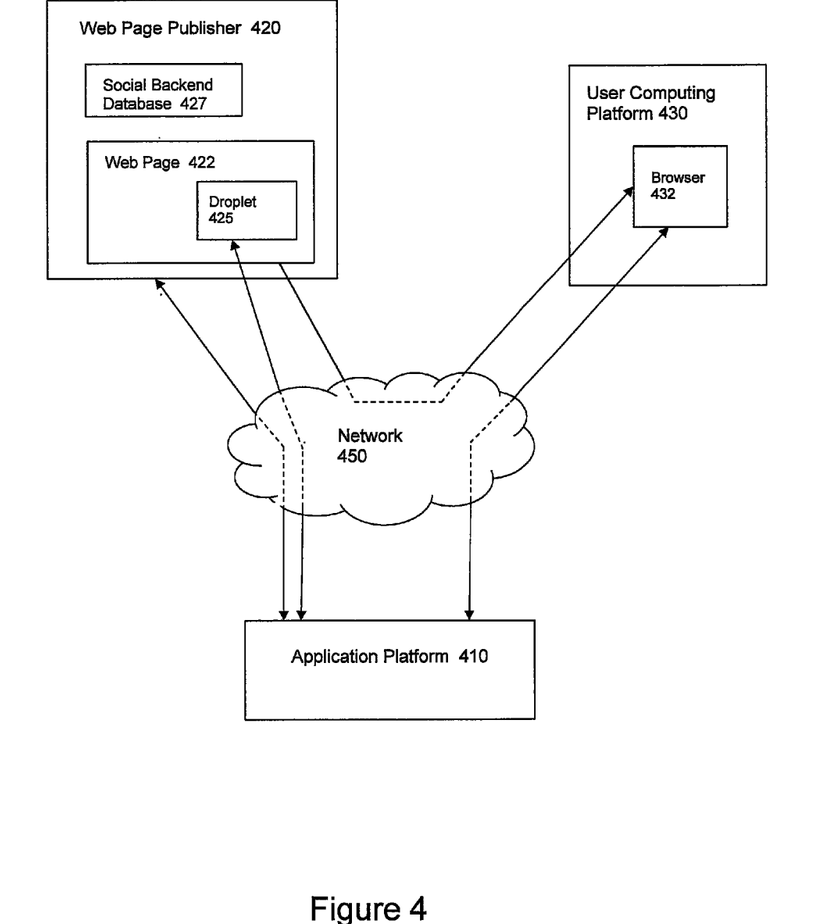
FIG. 4 is a diagram illustrating an example system including an application platform and a web page publisher including a social backend database in accordance with one or more embodiments.

FIG. 4 is a diagram illustrating an example system including an application platform 410 and a web page publisher 420 including a social backend database 427. Unlike the embodiments described above where the social backend database is maintained by an application platform, web publisher 420 comprises the social backend database. Other aspects of the system of FIG. 4 may be similar to those described above in connection with the embodiments illustrated in FIG. 1. Web page publisher 420 comprises a web page 422 that comprises an embedded droplet 425. A user computing platform 430 comprises a browser 432. Web page publisher 420, user computing platform 430, and application platform 410 may communicate with each other by way of a network 450 which, for this example, comprises the Internet. Of course, the system of FIG. 4 is merely an example embodiment, and other system configurations are possible.

For this example embodiment, social backend database 427 is stored at web page publisher 420. Such an arrangement may be advantageous if the web page publisher has social backend information that may be of value if included in an application. For an example, consider a web site that maintains friends lists for their users. The web publisher may desire to put those friends lists to work in one or more dropzone applications. To do so, for one embodiment, the social backend information may be transmitted by web page publisher 420 to application platform 410 in order to allow application platform 410 to incorporate the social backend information in the assembled javascript pages, which may be transmitted to user computing platform 430 through droplet 425. In such an embodiment, hooks may be provided in droplet 425 that would allow web page publisher 420 to monitor events as user computing platform 430 and application platform 410 communicate with each other through the droplet so that appropriate backend information may be provided. Of course, this is merely one example for how social backend information may be processed, and the scope of claimed subject matter is not limited in this respect.

Figure 5:
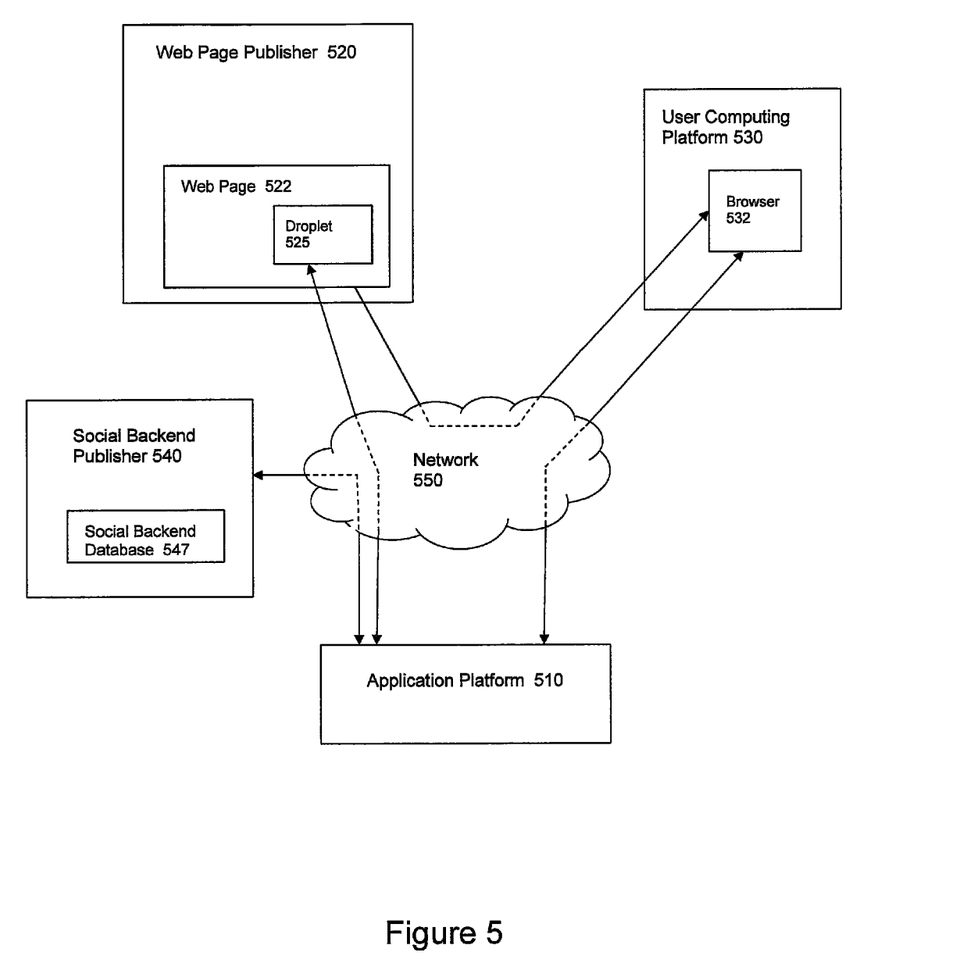
FIG. 5 is a diagram illustrating an example system including an application platform, a web page publisher, and a social backend publisher in accordance with one or more embodiments.

FIG. 5 is a diagram illustrating an alternative example system comprising an application platform 510, a web page publisher 520, and a social backend publisher 540. The example system of FIG. 5 also comprises a user computing platform 530. A network 550 may provide communication paths among social backend publisher 540, web page publisher 520, user computing platform 530, and application platform 510. User computing platform 530 for this example comprises a browser 532. The system of FIG. 5 for this example embodiment may be similar in many respects to the systems described above in connection with FIGS. 1 and 4. However, for one or more embodiments, a third-party social backend publisher may provide social backend information for one or more applications. This is in contrast to examples described above where the social backend information is provided by either the application platform and/or by the web page publisher. In this example embodiment, social backend publisher 540 may provide social information from a database 547 to application platform 510 in order for platform 510 to incorporate the social information in assembled javascript pages to be transmitted to user computing platform 530. With this example arrangement, social information from third parties, that is, from an entity other than web publisher 520 or application platform 510, may be put to advantageous use in one or more dropzone applications.

Other embodiments may employ combinations of the above example configurations for social backend databases. For example, embodiments are possible where social information may be provided by any combination of one or more of the web page publisher, the application platform, and/or the third party social information publisher.

Figure 6:
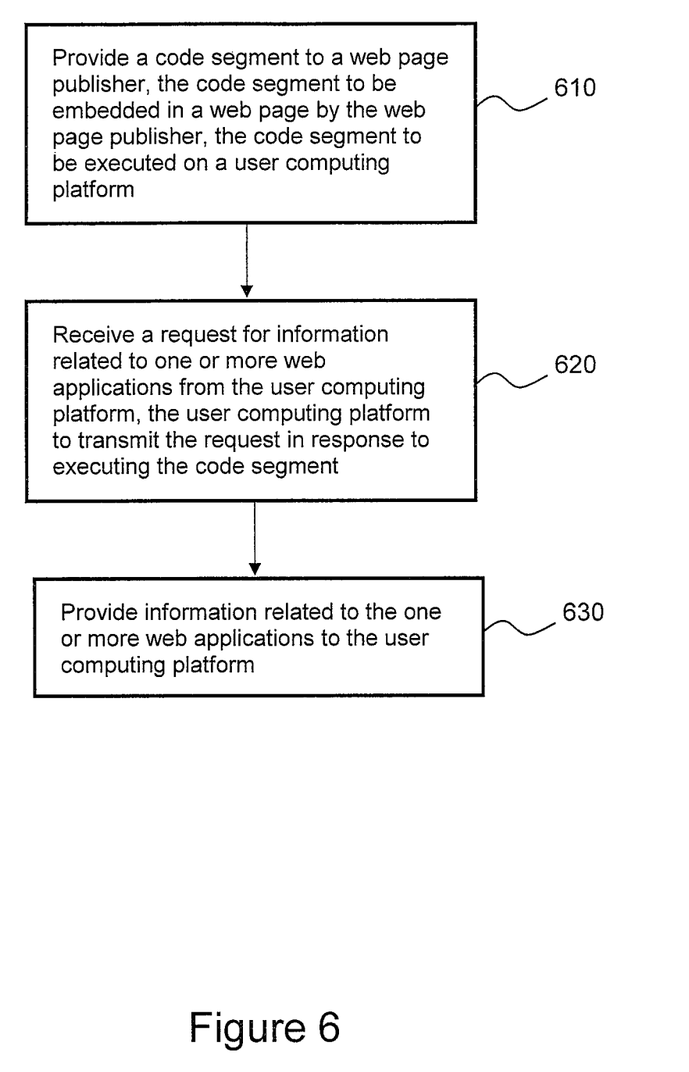
FIG. 6 is a flow diagram illustrating an example process for providing a code segment to be embedded in a web page in accordance with one or more embodiments.

FIG. 6 is a flow diagram illustrating an example process for providing a code segment to be embedded in a web page in accordance with one or more embodiments. At block 610, a code segment, or droplet, may be provided to a web page publisher. The code segment is to be embedded in a web page by the web page publisher, and the code segment is to be executed on a user computing platform. At block 620, a request for information may be received from the user computing platform. The request for information may be related to one or more web applications. The request may be made at least in part in response to the user computing platform executing the code segment. At block 630, information related to the one or more web applications may be provided to the user computing platform. Embodiments in accordance with claimed subject matter include more than, less than, or all of block 610-630. Further, the order of blocks 610-630 is merely an example order, and the scope of claimed subject matter is not limited in this respect.

Figure 7:
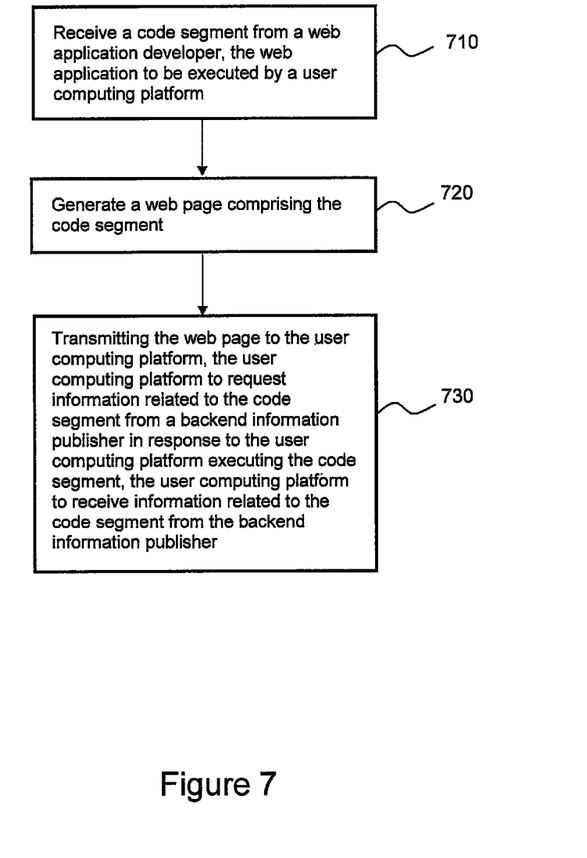
FIG. 7 is a flow diagram illustrating an example process for receiving a code segment to be embedded in a web page in accordance with one or more embodiments.

FIG. 7 is a flow diagram illustrating an example process for receiving a code segment to be embedded in a web page in accordance with one or more embodiments. At block 710, a code segment may be received from an application developer, wherein the web application is to be executed by a user computing platform. At block 720, a web page comprising the code segment may be generated, and at block 730, the web page may be transmitted to the user computing platform, wherein the user computing platform is to request information related to the code segment form a backend information publisher in response to the user computer platform executing the code segment, and wherein the user computing platform is to receive information related to the code segment from the backend information publisher. Embodiments in accordance with claimed subject matter include more than, less than, or all of block 710-730. Further, the order of blocks 710-730 is merely an example order, and the scope of claimed subject matter is not limited in this respect.

Figure 8:
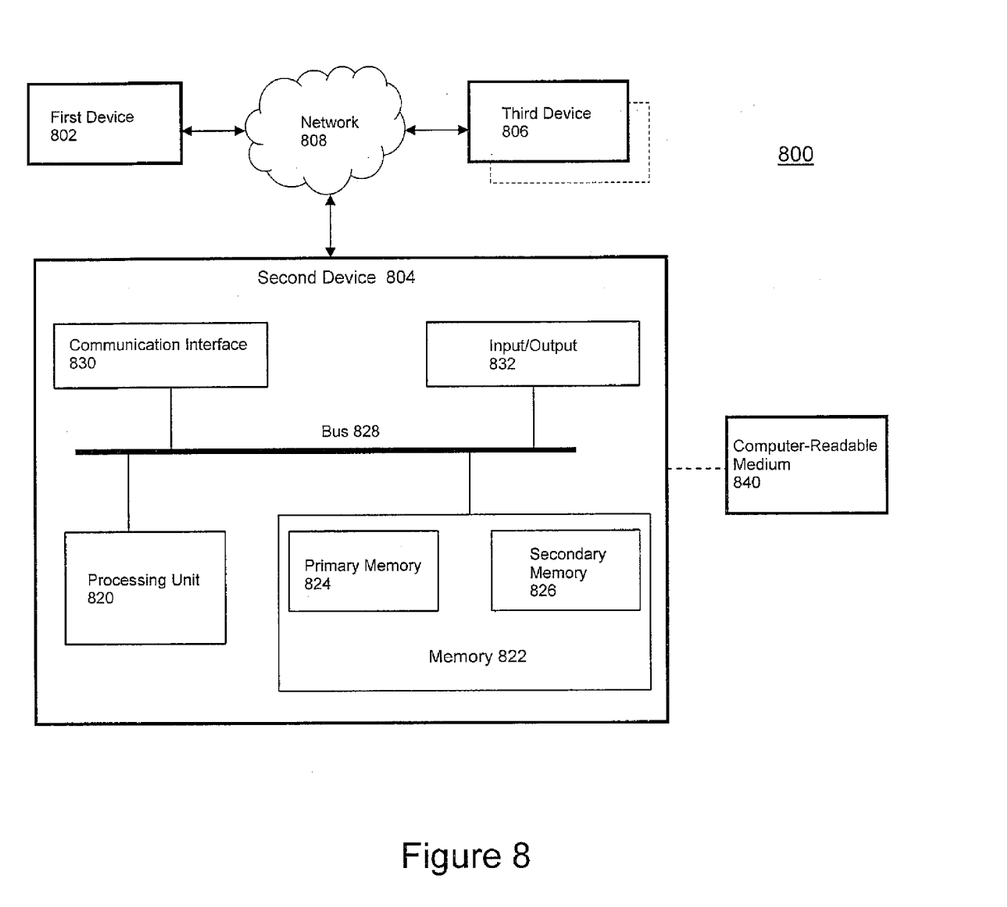
FIG. 8 is a block diagram illustrating an example system comprising a plurality of computing devices coupled via a network in accordance with one or more embodiments.

FIG. 8 is a schematic diagram illustrating an exemplary embodiment of a computing environment system 800 that may include one or more devices configurable to implement techniques and/or processes described above in connection with dropzones and/or droplets and/or web applications discussed above in connection with FIGS. 1-7, for example. System 800 may include, for example, a first device 802, a second device 804, and a third device 806, which may be operatively coupled together through a network 808.

First device 802, second device 804 and third device 806, as shown in FIG. 8, may be representative of any device, appliance or machine that may be configurable to exchange data over network 808. By way of example but not limitation, any of first device 802, second device 804, or third device 806 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 808, as shown in FIG. 8, is representative of one or more communication links, processes, and/or resources configurable to support the exchange of data between at least two of first device 802, second device 804, and third device 806. By way of example but not limitation, network 808 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to network 808.

It is recognized that all or part of the various devices and networks shown in system 800, and the processes and methods as further described herein, may be implemented using or otherwise include hardware, firmware, software, or any combination thereof.

Thus, by way of example but not limitation, second device 804 may include at least one processing unit 820 that is operatively coupled to a memory 822 through a bus 828.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 and/or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory and/or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any medium that can carry and/or make accessible data, code and/or instructions for one or more of the devices in system 800.

Second device 804 may include, for example, a communication interface 830 that provides for or otherwise supports the operative coupling of second device 804 to at least network 808. By way of example but not limitation, communication interface 830 may include a network interface device or card, a modem, a router, a switch, a transceiver, and the like.

Second device 804 may include, for example, an input/output 832. Input/output 832 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 832 may include an operatively configured display, speaker, keyboard, mouse, trackball, touch screen, data port, etc.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description herein.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that if executed by a computing platform, such as a computer, a computing system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magneto-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

Unless specifically stated otherwise, as apparent from the discussion herein, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
providing one or more signals indicative of a code segment from a web application platform to a web page publisher, wherein the code segment is embeddable in a web page by the web page publisher and wherein the code segment further comprises code executable by a user computing platform to direct the user computing platform to request information related to one or more web applications from the web application platform, wherein the web application platform is separate from the web page publisher;
receiving one or more signals indicative of a request for information related to the one or more web applications at the web application platform from the user computing platform at least in part in response to the user computing platform executing the code segment; and
providing one or more signals indicative of information related to the one or more web applications from the web application platform to the user computing platform.

2. The method of claim 1, wherein said providing the one or more signals indicative of the code segment comprises providing one or more signals indicative of code to provide a gallery of applications to a user to allow the user to select from among one or more web applications, the web application platform to transmit executable code related to the selected one or more web applications to the user computing platform to be executed by the user computing platform.

3. The method of claim 2, wherein said providing the one or more signals indicative of the code segment further comprises providing one or more signals indicative of code to allow the user to specify a look and/or feel of the executed code segment.

4. The method of claim 1, wherein said providing the one or more signals indicative of the code segment comprises providing one or more signals indicative of a code segment compliant with a Javascript specification.

5. The method of claim 1, wherein said providing the one or more signals indicative of the information related to the one or more web applications further comprises assembling information to be rendered at the user computing platform in connection with executing the code segment.

6. The method of claim 5, wherein said assembling information to be rendered comprises assembling social backend information related to the one or more web applications.

7. The method of claim 6, wherein the social backend information comprises one or more of a friends list, a user profile, and/or an image.

8. The method of claim 5, wherein said assembling information to be rendered at the user computing platform in connection with executing the code segment comprises assembling a batch of one or more web applications associated with a specified user identification.

9. The method of claim 8, wherein said assembling the batch of one or more web applications comprises assembling a batch of one or more of a game application, a fantasy sports application, a financial application, and/or a word processing application.

10. The method of claim 1, further comprising receiving one or more signals indicative of a specification for the code segment at the web application developer platform, and wherein said providing the one or more signals indicative of the code segment comprises providing the one or more signals indicative of the code segment at least in part in response to said receiving the one or more signals indicative of the specification for the code segment.

11. The method of claim 10, wherein said receiving the one or more signals indicative of the specification for the code segment comprises receiving one or more signals indicative of a specification according to a specified application programming interface.

12. A method, comprising:
receiving one or more signals indicative of a code segment at a web page publisher computing platform from a web application platform, wherein the code segment comprises code executable by a user computing platform to request information related to one or more web applications from a backend information publisher, wherein the web application platform is separate from the web page publisher;
generating one or more signals indicative of a web page at the web page publisher computing platform, the one or more signals indicative of the web page comprising one or more signals indicative of the code segment; and
transmitting the one or more signals indicative of the web page from the web page publisher computing platform to the user computing platform.

13. The method of claim 12, wherein the backend information publisher comprises the web application platform.

14. The method of claim 12, wherein said transmitting the one or more signals indicative of the web page to the user computing platform comprises transmitting the one or more signals indicative of the web page via an Internet in response to a user selecting a link pointing to the web page.

15. The method of claim 12, wherein said receiving the one or more signals indicative of the code segment further comprises receiving one or more signals indicative of a code segment comprising code to provide a gallery of applications to a user to allow the user to select from among one or more web applications, the web application platform to transmit executable code related to the selected one or more web application to the user computing platform to be executed by the user computing platform.

16. The method of claim 15, wherein said receiving the one or more signals indicative of the code segment comprises receiving one or more signals indicative of a code segment comprising code to allow the user to specify a look and/or feel of the executed code segment.

17. The method of claim 12, wherein said receiving the one or more signals indicative of the code segment comprises receiving one or more signals indicative of a code segment compliant with a Javascript specification.

18. The method of claim 12, wherein said information related to the one or more web applications to be requested by the user computing platform comprises information to be assembled at the backend information publisher, the assembled information to be rendered at the user computing platform in connection with executing the code segment.

19. The method of claim 18, wherein said assembled information to be rendered comprises social backend information related to the one or more web applications.

20. The method of claim 19, wherein the social backend information comprises one or more of a friends list, a user profile, and/or an image.

21. The method of claim 19, wherein said assembled information to be rendered at the user computing platform in connection with executing code segment comprises a batch of one or more web applications associated with a specified user identification.

22. The method of claim 21, wherein said assembled batch of one or more web applications comprises a batch of one or more of a game application, a fantasy sports application, a financial application, and/or a word processing application.

23. The method of claim 12, further comprising transmitting one or more signals indicative of a specification for the code segment from the web page publisher computing platform to the web application platform, and wherein said receiving the one or more signals indicative of the code segment comprises receiving the one or more signals indicative of the code segment at least in part in response to said transmitting the one or more signals indicative of the specification for the code segment.

24. The method of claim 23, wherein said transmitting the one or more signals indicative of the specification for the code segment comprises transmitting one or more signals indicative of a specification according to a specified application programming interface.

25. An article, comprising: a storage medium having stored thereon instructions executable by a computing platform to:
provide a code segment from a web application platform to a web page publisher, wherein the code segment is embeddable in a web page by the web page publisher and wherein the code segment further comprises code executable by a user computing platform to direct the user computing platform to request information related to one or more web applications from the web application platform, wherein the web application platform is separate from the web page publisher;
receive a request for information related to the one or more web applications from the user computing platform at the web application platform at least in part in response to the user computing platform executing the code segment; and
provide information related to the one or more web applications from the web application platform to the user computing platform.

26. The article of claim 25, wherein the storage medium has stored thereon further instructions executable by the computing platform to provide the code segment at least in part by providing code to provide a gallery of applications to a user to allow the user to select from among one or more web applications, the web application platform to transmit executable code related to the selected one or more web applications to the user computing platform to be executed by the user computing platform.

27. The article of claim 26, wherein the storage medium has stored thereon further instructions executable by the computing platform to provide the code segment at least in part by providing code to allow the user to specify a look and/or feel of the executed code segment.

28. The article of claim 25, wherein the storage medium has stored thereon further instructions executable by the computing platform to provide the code segment at least in part by providing a code segment compliant with a Javascript specification.

29. The article of claim 25, wherein the storage medium has stored thereon further instructions executable by the computing platform to provide information related to the one or more web applications at least in part by assembling information to be rendered at the user computing platform in connection with executing the code segment.

30. The article of claim 29, wherein the storage medium has stored thereon further instructions executable by the computing platform to assemble information to be rendered at the user computing platform in connection with executing the code segment by assembling social backend information related to the one or more web applications.

31. The article of claim 30, wherein the social backend information comprises one or more of a friends list, a user profile, and/or an image.

32. The article of claim 30, wherein the storage medium has stored thereon further instructions executable by the computing platform to assemble information to be rendered at the user computing platform in connection with executing the code segment at least in part by assembling a batch of one or more web applications associated with a specified user identification.

33. The article of claim 32, wherein the storage medium has stored thereon further instructions executable by the computing platform to assemble the batch of one or more web applications at least in part by assembling a batch of one or more of a game application, a fantasy sports application, financial application, and/or a word processing application.

34. The article of claim 25, wherein the storage medium has stored thereon further instructions executable by the computing platform to:
receive a specification for the code segment; and
provide the code segment by providing the code segment at least in part in response to said receiving the specification for the code segment.

35. The article of claim 34, wherein the storage medium has stored thereon further instructions executable by the computing platform to receive a specification for the code segment at least in part by receiving a specification according to a specified application programming interface.

36. An article, comprising: a storage medium having stored thereon instructions executable by a computing platform to:
receive a code segment at a web page publisher from a web application platform, wherein the code segment comprises code executable by a user computing platform to request information related to one or more web applications from a backend information publisher, wherein the web application platform is separate from the web page publisher;
generate a web page comprising the code segment; and
transmit the web page to the user computing platform.

37. The article of claim 36, wherein the backend information publisher comprises the web application platform.

38. The article of claim 36, wherein the storage medium has stored thereon further instructions executable by the computing platform to transmit the web page to the user computing platform at least in part by transmitting the web page via an Internet in response to a user selecting a link pointing to the web page.

39. The article of claim 38, wherein the storage medium has stored thereon further instructions executable by the computing platform to receive the code segment at least in part by receiving code to provide a gallery of applications to a user to allow the user to select from among one or more web applications, the web application platform to transmit executable code related to the selected one or more web application to the user computing platform to be executed by the user computing platform.

40. The article of claim 39, wherein the storage medium has stored thereon further instructions executable by the computing platform to receive the code segment at least in part by receiving code to allow the user to specify a look and/or feel of the executed code segment.

41. The article of claim 36, wherein the storage medium has stored thereon further instructions executable by the computing platform to receive the code segment at least in part by receiving a code segment compliant with a Javascript specification.

42. The article of claim 36, wherein said information related to the one or more web applications to be requested by the user computing platform comprises information to be assembled at the backend information publisher, the assembled information to be rendered at the user computing platform in connection with executing the code segment.

43. The article of claim 42, wherein said assembled information to be rendered comprises social backend information related to the one or more web applications.

44. The article of claim 43, wherein the social backend information comprises one or more of a friends list, a user profile, and/or an image.

45. The article of claim 43, wherein said assembled information to be rendered at the user computing platform in connection with executing the code segment comprises a batch of one or more web applications associated with a specified user identification.

46. The article of claim 45, wherein said assembled batch of one or more web applications comprises a batch of one or more of a game application, a fantasy sports application, a financial application, and/or a word processing application.

47. The article of claim 36, wherein the storage medium has stored thereon further instructions executable by the computing platform to transmit a specification for the code segment to the web application platform, and to receive the code segment at least in part in response to said transmitting the specification for the code segment.

48. The article of claim 47, wherein the storage medium has stored thereon further instructions executable by the computing platform to transmit the specification for the code segment by transmitting the specification according to a specified application programming interface.

49. An apparatus, comprising:
means for providing a code segment from a web application platform to a web page publisher, wherein the code segment is embeddable in a web page by the web page publisher and wherein the code segment further comprises code executable by a user computing platform to direct the user computing platform to request information related to one or more web applications from the web application platform, wherein the web application platform is separate from the web page developer;
means for receiving a request for information related to the one or more web applications from the user computing platform at least in part in response to the user computing platform executing the code segment; and
means for providing information related to the one or more web applications to the user computing platform.

50. An apparatus, comprising:
means for receiving a code segment at a web page publisher from a web application platform, wherein the code segment comprises code executable by a user computing platform to request information related to one or more web applications from a backend information publisher;
means for generating a web page comprising the code segment; and
means for transmitting the web page from the web page publisher to the user computing platform.

* * * * *